(12) United States Patent
Higai et al.

(10) Patent No.: US 11,235,812 B2
(45) Date of Patent: Feb. 1, 2022

(54) AUTOMOTIVE FRAME PART

(71) Applicant: JFE STEEL CORPORATION, Tokyo (JP)

(72) Inventors: Kazuhiko Higai, Tokyo (JP); Takanobu Saito, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 4 days.

(21) Appl. No.: 16/648,037

(22) PCT Filed: Aug. 1, 2018

(86) PCT No.: PCT/JP2018/028796
§ 371 (c)(1),
(2) Date: Mar. 17, 2020

(87) PCT Pub. No.: WO2019/064909
PCT Pub. Date: Apr. 4, 2019

(65) Prior Publication Data
US 2020/0239081 A1   Jul. 30, 2020

(30) Foreign Application Priority Data

Sep. 29, 2017 (JP) .............................. JP2017-189571
Jan. 16, 2018 (JP) .............................. JP2018-004609

(51) Int. Cl.
*B62D 25/04* (2006.01)
*B62D 27/02* (2006.01)
(Continued)

(52) U.S. Cl.
CPC ............. *B62D 25/04* (2013.01); *B62D 25/08* (2013.01); *B62D 27/023* (2013.01); *B62D 29/005* (2013.01)

(58) Field of Classification Search
CPC .... B62D 25/04; B62D 27/001; B62D 27/005; B62D 27/02; B62D 27/023; B62D 27/026; B62D 29/001; B62D 29/005
(Continued)

(56) References Cited

U.S. PATENT DOCUMENTS 6,447,052 B2 *  9/2002  Saeki ..................... B62D 21/15
                                              296/187.09
6,607,239 B1 *  8/2003  Fuji ......................... B60R 22/24
                                              296/203.03
(Continued)

FOREIGN PATENT DOCUMENTS

CN  102149593 A  8/2011
CN  103661612 A  3/2014
(Continued)

OTHER PUBLICATIONS

Oct. 23, 2020 Search Report issued in European Patent Application No. 18863152.7.
(Continued)

*Primary Examiner* — Dennis H Pedder
(74) *Attorney, Agent, or Firm* — Oliff PLC

(57) ABSTRACT

An automotive frame part that is an A-pillar-lower part, the A-pillar-lower part including: an outer panel having approximately a T-shape in planar view and a cross section intersecting a portion corresponding to a horizontal side and a vertical side of the T-shape is a hat-shaped cross section including a top portion, a side wall portion, and a flange portion; an inner panel being connected to the flange portion and forming a closed cross section with the outer panel; and plastic stiffening members that each have one end connected to an inner surface of the outer panel and another end connected to an inner surface of the inner panel, wherein the shape and the disposition of the stiffening members are set based on an analysis result from a shape optimization
(Continued)

analysis method and each of the stiffening members has a columnar shape or a columnar shape with both end parts bulging.

4 Claims, 11 Drawing Sheets

(51) Int. Cl.
  *B62D 29/00* (2006.01)
  *B62D 25/08* (2006.01)
(58) Field of Classification Search
  USPC .................................................. 296/193.06
  See application file for complete search history.

(56) References Cited

U.S. PATENT DOCUMENTS

| | | | |
|---|---|---|---|
| 9,022,458 B2 * | 5/2015 | Hasegawa | B62D 29/043 296/191 |
| 10,173,729 B2 * | 1/2019 | Terada | B62D 29/04 |
| 2001/0020797 A1 | 9/2001 | Saeki | |
| 2002/0089215 A1 * | 7/2002 | Frasher | B60R 21/04 296/203.02 |
| 2007/0278828 A1 * | 12/2007 | Anders | B62D 25/04 296/193.06 |
| 2011/0137443 A1 * | 6/2011 | Farahani | G06F 30/20 700/98 |
| 2012/0049575 A1 | 3/2012 | Marquette | |
| 2014/0084635 A1 | 3/2014 | Matsuda et al. | |
| 2015/0151796 A1 * | 6/2015 | Berger | B62D 25/04 296/193.06 |
| 2016/0194036 A1 | 7/2016 | Kurokawa | |
| 2016/0257345 A1 | 9/2016 | Hasegawa et al. | |

FOREIGN PATENT DOCUMENTS

| | | | | |
|---|---|---|---|---|
| CN | 105473424 A | | 4/2016 | |
| DE | 4335029 | * | 4/1995 | ............ B62D 25/04 |
| EP | 0882640 A2 | | 12/1998 | |
| EP | 0882640 A3 | | 6/1999 | |
| EP | 2154052 A1 | | 2/2010 | |
| EP | 2891528 A1 | | 7/2015 | |
| JP | 2001-253365 A | | 9/2001 | |
| JP | 2002-337734 A | | 11/2002 | |
| JP | 2007-01515 A | | 1/2007 | |
| JP | 2008-247347 A | | 10/2008 | |
| JP | 2011-207403 A | | 10/2011 | |
| JP | 2014-80182 A | | 5/2014 | |
| JP | 2014-166767 A | | 9/2014 | |
| JP | 2015-202761 A | | 11/2015 | |
| JP | 2016-159812 A | | 9/2016 | |
| WO | 2010/018190 A1 | | 2/2010 | |

OTHER PUBLICATIONS

Oct. 23, 2018 International Search Report issued in International Patent Application No. PCT/JP2018/028796.
Oct. 8, 2021 Office Action issued in Chinese Patent Application No. 201880061706.5.
Jul. 22, 2021 Office Action issued in Korean Patent Application No. 10-2020-7007522.
Saito, T., et al., "Development of Optimization Method for Automotive Parts and Structures," SAE Technical Paper, 2014-01-0410, Apr. 1, 2014.
User's guide, HyperWorks, Altair Engineering Inc., Aug. 2009 (with partial translation).

* cited by examiner (a)  (b)

AUTOMOTIVE FRAME PART

FIELD

The present invention relates to automotive frame parts made of metal, particularly, automotive frame parts that are A-pillar-lower parts having plastic stiffening members provided to a space formed of an outer panel and an inner panel.

BACKGROUND

There are many techniques related to a weight reduction method of automotive frame parts made of metal. Examples of the techniques include thinning a material with application of an ultra high-tensile steel sheet and changing a material from a steel sheet to an aluminum sheet. Press formed parts that are formed of aluminum instead of a steel sheet tend to increase year by year, however, an increase in cost of base metal sheets is inevitable. Thus, a method in which a shape part incorporating a plurality of peripheral parts is manufactured with an aluminum die cast method and cost is reduced by cutting cost of tools for press forming and the like has recently been applied.

As a technique of manufacturing automotive frame parts with the aluminum die cast method, for example, Patent Literature 1 discloses an aluminum die cast C-pillar for a vehicle that is provided with a rib having a specific shape.

CITATION LIST

Patent Literature

Patent Literature 1: Japanese Laid-open Patent Publication No. 2008-247347

SUMMARY

Technical Problem

Because specific gravity of aluminum is approximately one third of that of steel, aluminum is light. However, the Young's modulus of aluminum is also approximately one third as compared with that of steel and in order to ensure the same stiffness of parts as that of the conventional parts, aluminum parts are required to take actions causing an increase in weight such as ensuring of a sheet thickness equal to or more than a sheet thickness of steel sheet parts and giving of rib configuration. Thus, a weight reduction effect has been blocked due to reduction of productivity of parts and an increase in cost. Generally, it is difficult for aluminum die cast parts to be spot-welded. Thus, the aluminum die cast parts require mechanical fastening, and assembly has been made difficult on the conventional automotive assembly line.

In this manner, in aluminum automotive frame parts, effectiveness of low specific gravity cannot be fully utilized due to the low Young's modulus, and weight reduction of the aluminum automotive frame parts cannot be sufficiently achieved.

In crash worthiness of an automobile, A-pillar-lower parts are important parts for a frontal oblique crash recently attracting attention. Thus, A-pillar-lower parts satisfying both ensuring of stiffness and weight reduction have been desired.

Furthermore, when automotive frame parts formed of an outer panel and an inner panel are stiffened, partitioning parts such as a metal bulkhead are often introduced for the purpose of connecting the outer panel and the inner panel to each other. However, the partitioning parts are large parts and are heavy in weight, and are less than light. There is a method for injecting a foaming resin and the like into the entire space formed of an outer panel and an inner panel, but stiffness of the foaming resin itself is low, and only filling cannot expect the stiffness to be greatly improved. Thus, foaming resin needs to be injected into the entire frame parts, and it is difficult to check a filling state, thereby causing a problem in repairing property.

The present invention is provided in order to solve the problems described above, and an object of the present invention is to provide automotive frame parts capable of ensuring stiffness and reducing weight.

Solution to Problem

To solve the problem and achieve the object, an automotive frame part that is an A-pillar-lower part including an outer panel and an inner panel made of metal, the outer panel having approximately a T-shape in planar view and a cross section intersecting a portion corresponding to a horizontal side and a vertical side of the T-shape is a hat-shaped cross section including a top portion, a side wall portion, and a flange portion, the inner panel being connected to the flange portion of the outer panel and forming a closed cross section with the outer panel according to the present invention includes: plastic stiffening members that each have one end connected to an inner surface of the outer panel and another end connected to an inner surface of the inner panel in a space formed between the outer panel and the inner panel, wherein the shape and the disposition of the stiffening members are set based on an analysis result from a shape optimization analysis method and each of the stiffening members has a columnar shape or a columnar shape with both end parts bulging.

Moreover, in the automotive frame part according to the present invention, the shape optimization analysis method sets an objective function for maximizing stiffness and performs analysis under a constraint function of setting a volume constraints rate of 3 to 40%, using the solid isotropic material with penalization method of topology optimization.

Moreover, the automotive frame part that is the A-pillar-lower part according to the present invention further includes a locker connecting portion to which the tip of a locker is connected, wherein the stiffening members are disposed at the locker connecting portion in the space and at a part above the central part in a height direction of the A-pillar-lower part.

Moreover, in the automotive frame part according to the present invention, the shape optimization analysis method sets an objective function for minimizing volume and maximizing stiffness and performs analysis under a constraint function of setting a predetermined displacement amount, using the solid isotropic material with penalization method of topology optimization.

Advantageous Effects of Invention

The present invention includes an outer panel and an inner panel. The outer panel has approximately a T-shape in planar view and has a hat-shaped cross section intersecting portions each corresponding to a horizontal side and a vertical side in approximately the T-shape that is formed of a top portion, a side wall portion, and a flange portion. The inner panel is connected to the flange portion of the outer panel and forms a closed cross section with the outer panel. The inner panel and the outer panel are automotive frame parts that are A-pillar-lower parts made of metal. In a space formed between the outer panel and the inner panel, the present invention includes a plurality of plastic stiffening members that each have one end connected to an inner surface of the outer panel and another end connected to an inner surface of the inner panel. The shape and the disposition of the stiffening members are set based on an analysis result from a shape optimization analysis method. Each of the stiffening members has a columnar shape or a columnar shape with both end parts bulging to reduce deformation when a load acts on the automotive frame parts and improve stiffness of the automotive frame parts. In addition, according to the present invention, weight of automotive frame parts can be reduced while stiffness thereof is maintained.

DESCRIPTION OF EMBODIMENTS

An A-pillar-lower part according to an embodiment of the present invention will be described below based on FIGS. 1 and 2.

Figure 1:
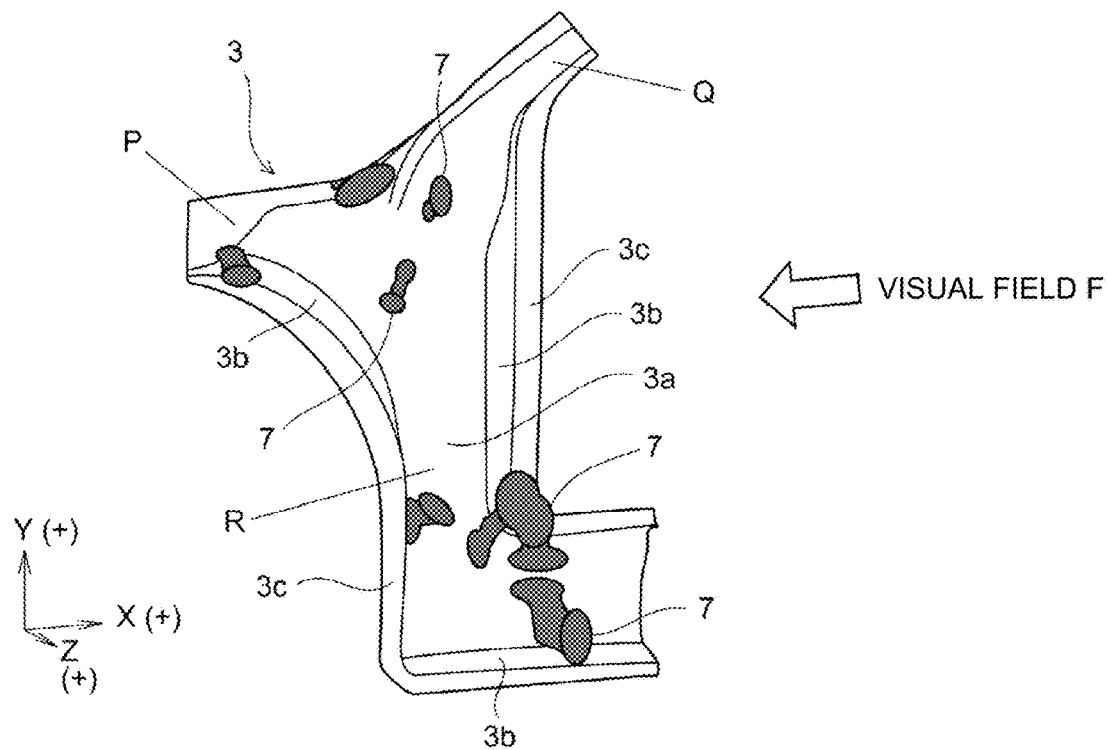
FIG. 1 is a perspective view of an automotive frame part in accordance with an embodiment of the present invention.
Figure 2:
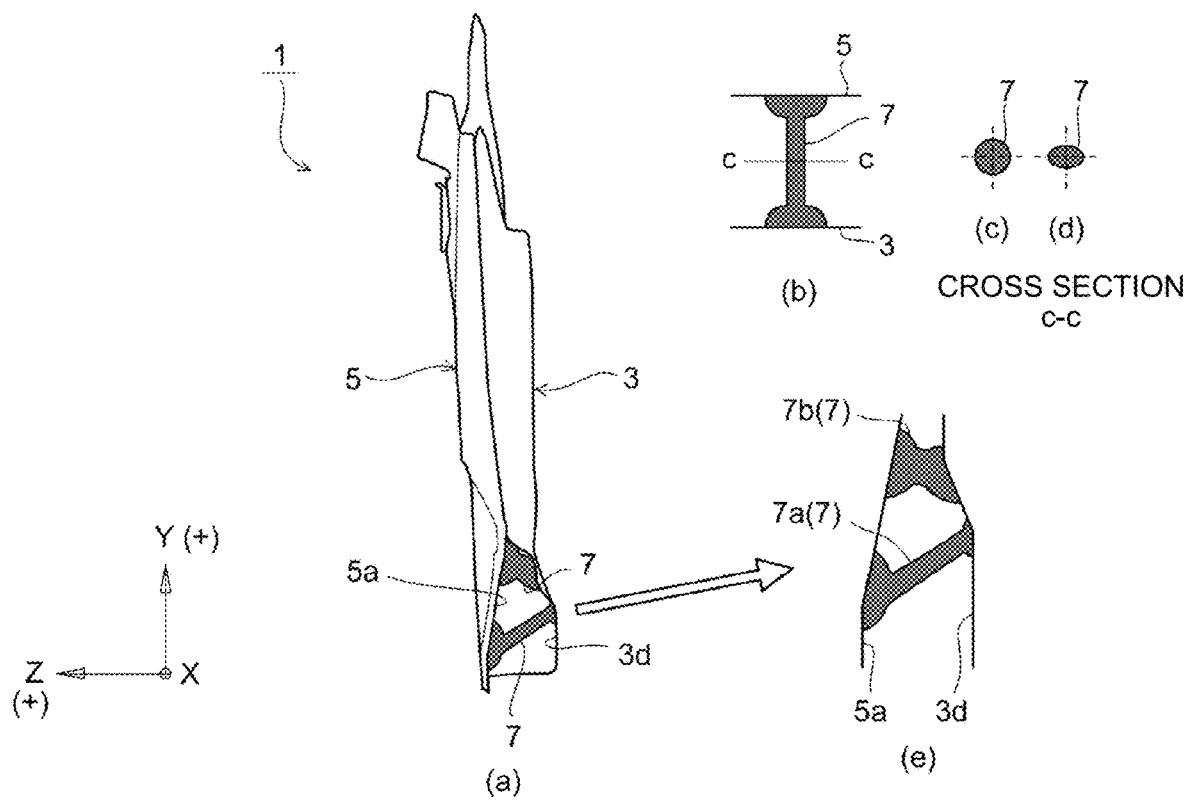
FIG. 2 is a side view of the automotive frame part in accordance with the embodiment of the present invention.

An A-pillar-lower 1 according to the present embodiment illustrated in FIGS. 1 and 2 (visual field F in FIG. 1 (visual field that is seen from a rear side of the A-pillar-lower 1)) is an automotive frame part that includes an outer panel 3 having approximately a T-shape in planar view and an inner panel 5 connected to a flange portion 3c of the outer panel 3 and forming a closed cross section with the outer panel 3. As illustrated in FIG. 2, in a space formed between the outer panel 3 and the inner panel 5, the A-pillar-lower 1 includes a plurality of stiffening members 7 that each have one end thereof connected to an inner surface 3d of the outer panel 3 and another end connected to an inner surface 5a of the inner panel 5. The shape and the disposition of the stiffening members 7 are set based on an analysis result from a shape optimization analysis method. Each of the stiffening members 7 has a columnar shape with both end parts bulging.

The following describes each configuration. The coordinate axis illustrated in the drawings indicates disposition when the A-pillar-lower 1 is installed on an automobile. An x-axis, a y-axis, and a z-axis indicate a front-back direction of an automobile, a vertical direction of the automobile, and a width direction of the automobile, respectively.

Outer Panel

As illustrated in FIG. 1, the outer panel 3 made of metal has approximately a T-shape in planar view and includes portions (portions P and Q in FIG. 1) corresponding to a horizontal side in approximately the T-shape and a portion (portion R in FIG. 1) corresponding to a vertical side.

The portion P extends to the front side of an automobile (x-axis minus direction in FIG. 1) in the upper part of the outer panel 3, and is connected to the other automotive frame part provided to a front part of the automobile.

The portion Q extends upward to the rear side of an automobile (x-axis plus direction and y-axis plus direction)

in the upper part of the outer panel 3, and is connected to an A-pillar-upper (not illustrated).

The portion R extends from the horizontal side in approximately the T-shape to the lower side of an automobile (y-axis minus direction in FIG. 1). In addition, a bottom end of the portion R is curved in an L-shape toward the rear side of an automobile (x-axis plus direction) and is connected to a locker (not illustrated).

A cross section intersecting the portions P, Q, and R is a hat-like cross section formed of a top portion 3a, a side wall portion 3b, and the flange portion 3c. The outer panel 3 having a hat-like cross section can be manufactured by press forming, for examples, a steel sheet and an aluminum sheet. The outer panel 3 can be also manufactured by casting such as aluminum die casting.

Inner Panel

Figure 3:
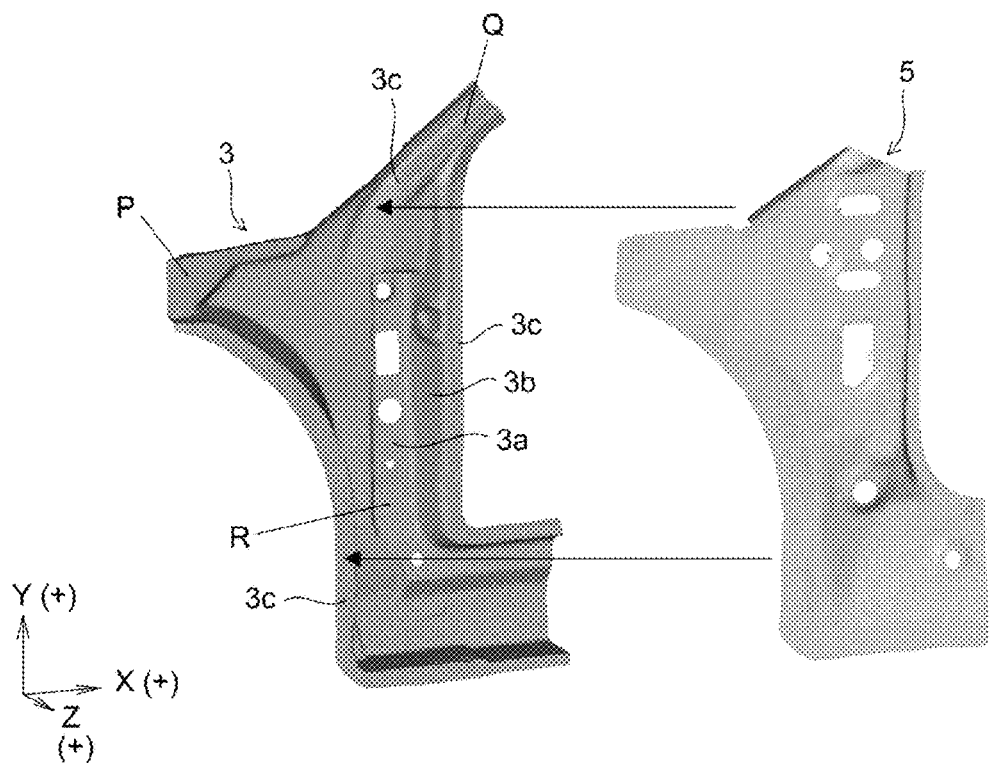
FIG. 3 is a perspective view of an outer panel and an inner panel used for the automotive frame part in accordance with the embodiment.
Figure 4:
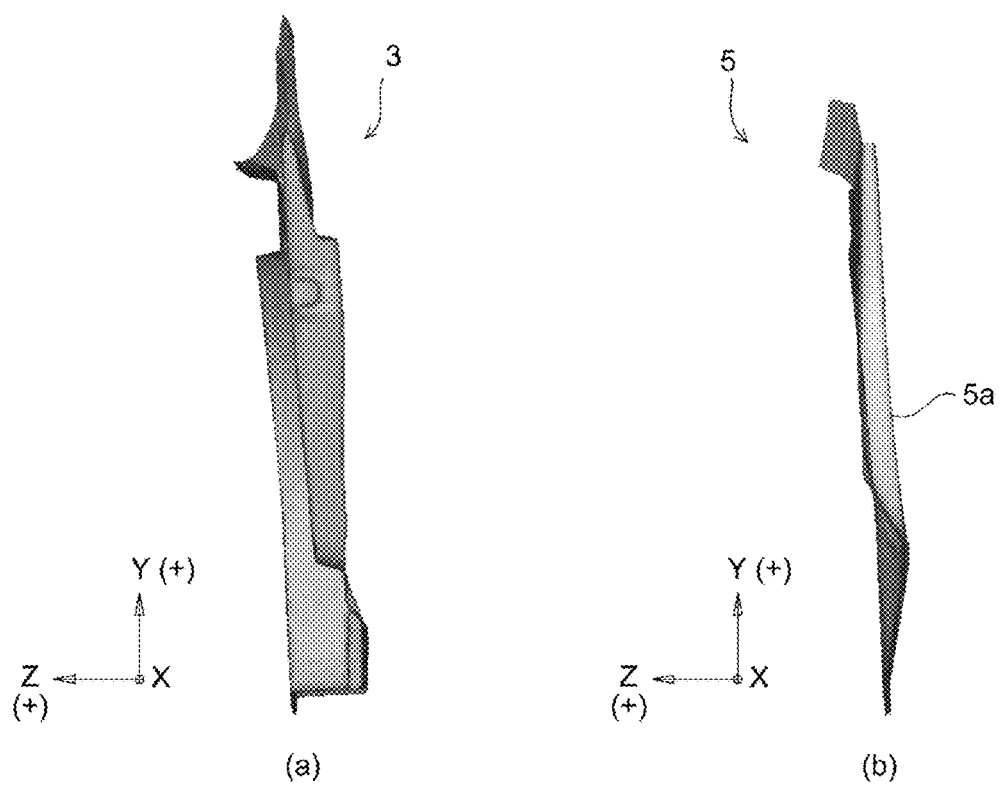
FIG. 4 is a side view of the outer panel and the inner panel used for the automotive frame part in accordance with the embodiment.

The inner panel 5 made of metal is connected to the flange portion 3c of the outer panel 3 (see FIGS. 3 and 4), and forms a closed cross section with the outer panel 3.

The closed cross section is formed by being enclosed with the top portion 3a and the side wall portion 3b of the outer panel 3 and the inner surface 5a of the inner panel 5, which forms a space between the outer panel 3 and the inner panel 5.

Similarly to outer panel 3, the inner panel 5 can be manufactured by press forming, for examples, a steel sheet and an aluminum sheet. The inner panel 5 can be also manufactured by casting such as aluminum die casting.

Stiffening Member

As illustrated in FIG. 2, the stiffening member 7 has one end connected to the inner surface 3d of the outer panel 3 and the other end connected to the inner surface 5a of the inner panel 5 in a space formed between the outer panel 3 and the inner panel 5, and a plurality of the stiffening members 7 are provided.

Each of the shape of the stiffening members 7 has a columnar shape with both end parts bulging. The one bulging end of the stiffening member 7 is connected to the inner surface 3d of the outer panel 3, and the other end is connected to the inner surface 5a of the inner panel 5.

The shape and the disposition of the stiffening members 7 are set based on an analysis result of shape optimization analysis, which will be described later. The shape and the disposition of the stiffening members 7 are set in this manner to form a bridge structure in a space formed of the outer panel 3 and the inner panel 5.

As illustrated in FIG. 2B, examples of a columnar shape with both end parts bulging that is the shape of the stiffening members 7 include a cylindrical shape (FIG. 2C) or a cylindrical shape having a flat cross section (FIG. 2D) and a femur-shaped shape having a thin central part in a longitudinal direction and being bulging from the central part to both of the ends.

Understandably, the shape of the stiffening members 7 is not limited to the shape illustrated in FIG. 2B, and may be only a columnar shape. As illustrated in FIG. 2E, the stiffening member 7 may be a stiffening member 7a having one end side of a long and thin columnar shape more bulging, and may be a stiffening member 7b having a short and thinly constricted central part. In addition, a cross section of the central part in a columnar shape is not limited to a circular shape, a flat circular shape, and the like as illustrated in FIGS. 2C and 2D, and may be a polygonal shape such as a triangle and a square.

The material of the stiffening members 7 is, from the viewpoint of weight in addition to ease of processing the stiffening members 7 into various shapes, defined as plastic (rigid plastic, fiber-reinforced plastic, and the like). In particular, carbon fiber reinforced plastic (CFRP) and glass fiber reinforced plastic (GFRP) that are fiber-reinforced plastic are more preferable from the aspect of improvement of stiffness.

The plastic stiffening members 7 can be manufactured by, for example, injection molding based on an analysis result obtained by shape optimization analysis, but a method for manufacturing the stiffening members 7 is not limited to the injection molding.

The stiffening members 7, the outer panel 3, and the inner panel 5 can be connected to each other by an adhesive or mechanical fastening.

Shape Optimization Analysis Method

The following describes a shape optimization analysis method for setting the shape and the disposition of the stiffening members 7.

The shape optimization analysis method is not a method for assuming a predetermined shape in advance and obtaining an optimal shape on the premise of the predetermined shape. The shape optimization analysis method is a method for obtaining an optimal shape satisfying given analysis conditions by the topology optimization and the like without assuming a predetermined shape.

The topology optimization is a method for providing a design space of a certain size, incorporating three-dimensional elements in the design space, and satisfying given analysis conditions and leaving the minimum necessary three-dimensional element to obtain an optimal shape satisfying the analysis conditions. The topology optimization uses a method for directly constraining three-dimensional elements forming the design space and directly adding a load.

According to the embodiment of the present invention, plastic stiffening members are set in a space formed between the outer panel 3 and the inner panel 5 so as to improve stiffness of the A-pillar-lower 1. Thus, using a space between the outer panel 3 and the inner panel 5 that is filled with the stiffening members as an analysis object, shape optimization analysis is performed, and the stiffening members 7 having an optimal shape are set based on an analysis result in which an unnecessary part is removed by the optimization analysis.

Figure 5:
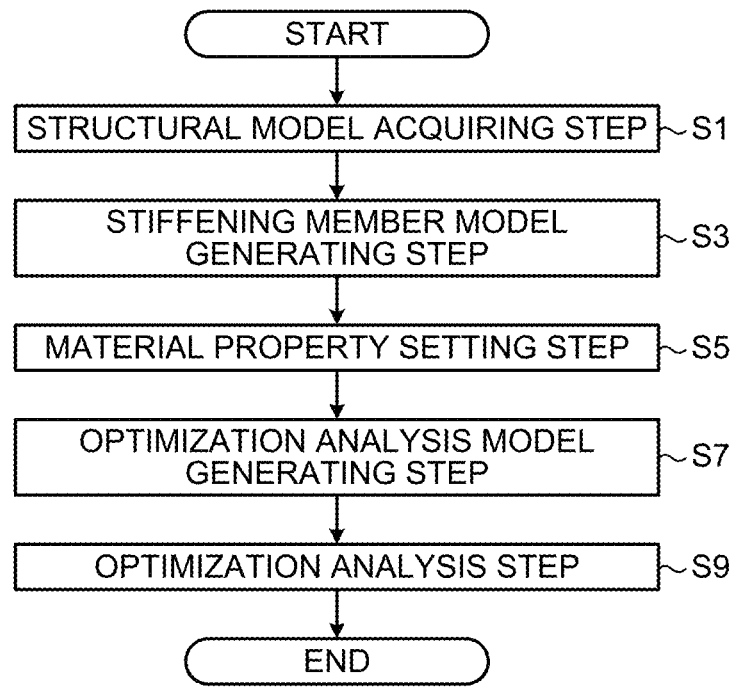
FIG. 5 is a flowchart illustrating a flow of processing for shape optimization analysis of stiffening members in the automotive frame part according to the present embodiment.

The shape optimization analysis can be performed by executing step S1 to step S9 illustrated in FIG. 5. The following describes the processing at each step illustrated in FIG. 5. Step S1 to step S9 can be executed on a computer.

Structural Model Acquiring Step

Structural model acquiring step S1 is a step for acquiring a structural model that is modeled automotive frame parts using two-dimensional elements and/or three-dimensional elements.

In the present embodiment, a structural model targets the A-pillar-lower 1 (see FIGS. 1 and 2) that is an automotive frame part stiffened by setting the stiffening members 7.

Stiffening Member Model Generating Step

Stiffening member model generating step S3 is a step for generating a stiffening member model (not illustrated) that is formed of three-dimensional elements and is combined with the structural model.

In the present embodiment, the stiffening member model generates a plurality of three-dimensional elements in order to fill a space formed of the outer panel 3 and the inner panel 5 illustrated in FIG. 2.

The stiffening member model generated in this manner is a target of optimization analysis at optimization analysis model generating step S7, which will be described later. In the process of optimization analysis, a three-dimensional element positioned at a portion unnecessary for stiffening is erased and a three-dimensional element positioned at a portion necessary for stiffening remains.

Material Property Setting Step

Material property setting step S5 is a step for setting the material property of the stiffening member model generated at stiffening member model generating step S3.

The present invention targets a plastic stiffening member. Thus, examples of the material property set to the stiffening member model at material property setting step S5 include Young's modulus of plastic, a Poisson's ratio, and specific gravity.

In addition, when the stiffening member is made of plastic, the material property of which has in-plane anisotropy, for example, fiber reinforced plastics (FRP), the material property of a stiffening member model may be set in consideration of anisotropy.

Optimization Analysis Model Generating Step

At optimization analysis model generating step S7, a stiffening member model generated at stiffening member model generating step S3 is combined with the structural model to generate an optimization analysis model (not illustrated).

For example, when a structural model is modeled with two-dimensional elements, the combination of the structural model with the stiffening member model can be executed by sharing a node (node point) of three-dimensional elements forming the stiffening member model and a node of the two-dimensional elements of the structural model.

However, the combination of a structural model with a stiffening member model is not limited to the node sharing described above. A structural model and a stiffening member model may be combined with each other through rigid elements, beam elements, two-dimensional elements, and the like. In any case, any element may be used if the element can combine a structural model with a stiffening member model so that a load is transmitted between the structural model and the stiffening member model in the shape optimization analysis.

Optimization Analysis Step

Optimization analysis step S9 is a step for giving analysis conditions to an optimization analysis model generated at optimization analysis model generating step S7, performing optimization analysis using the stiffening member model as a target, and obtaining an optimal shape of the stiffening member model.

Examples of analysis conditions given to an optimization analysis model include load and constraint conditions for giving a position to which a load is added and a constraint position, and an objective function and a constraint function set depending on an objective of optimization analysis.

Multiple input functions of a load can be considered for evaluating stiffness of automotive frame parts serving as an objective function. However, after stiffness of an automobile for installing automotive frame parts was variously evaluated, at optimization analysis step S9, a pre-obtained load the displacement of which became largest during actual running was given as an input condition to obtain the optimal shape and position of a stiffening member model under the load input condition.

Figure 6:
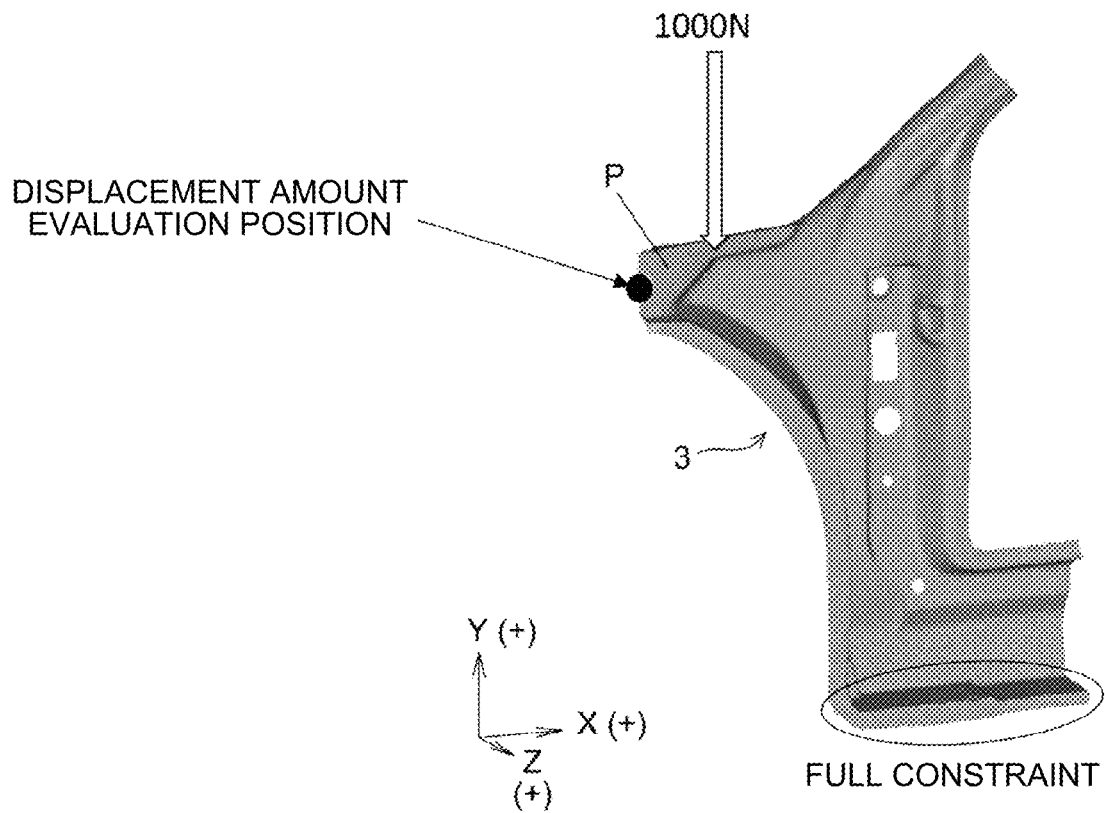
FIG. 6 is a view of the stiffening member in the automotive frame part according to the present embodiment, illustrating an example of analysis conditions in the shape optimization analysis.

FIG. 6 illustrates an example of load and constraint conditions given to an optimization analysis model. FIG. 6 displays a position to which a load (1,000N) is applied and a constrained position on the outer panel 3. At optimization analysis step S9, load and constraint conditions are given to an optimization analysis model in which a stiffening member model is combined with a structural model that is the modeled outer panel 3 and inner panel 5 of the A-pillar-lower to perform optimization analysis.

In the present embodiment, a load of 1,000N was applied to the tip of a front-end part of the A-pillar-lower (corresponding to the portion P of the outer panel 3 in FIG. 6) downward in a vertical direction to create load and constraint conditions for fully constraining the bottom surface (corresponding to a portion surrounded by an ellipse in FIG. 6) of a connection part connecting the A-pillar-lower with the locker (not illustrated).

Furthermore, in the present embodiment, the maximum stiffness at an evaluation position and a volume constraints rate of a stiffening member model are given as an objective function and a constraint function of optimization analysis, respectively. In consideration of an increase in weight of the stiffening members 7 and weight reduction due to thinning of the A-pillar-lower 1, the volume constraints rate may be selected from a range of 3 to 40%.

Figure 7:
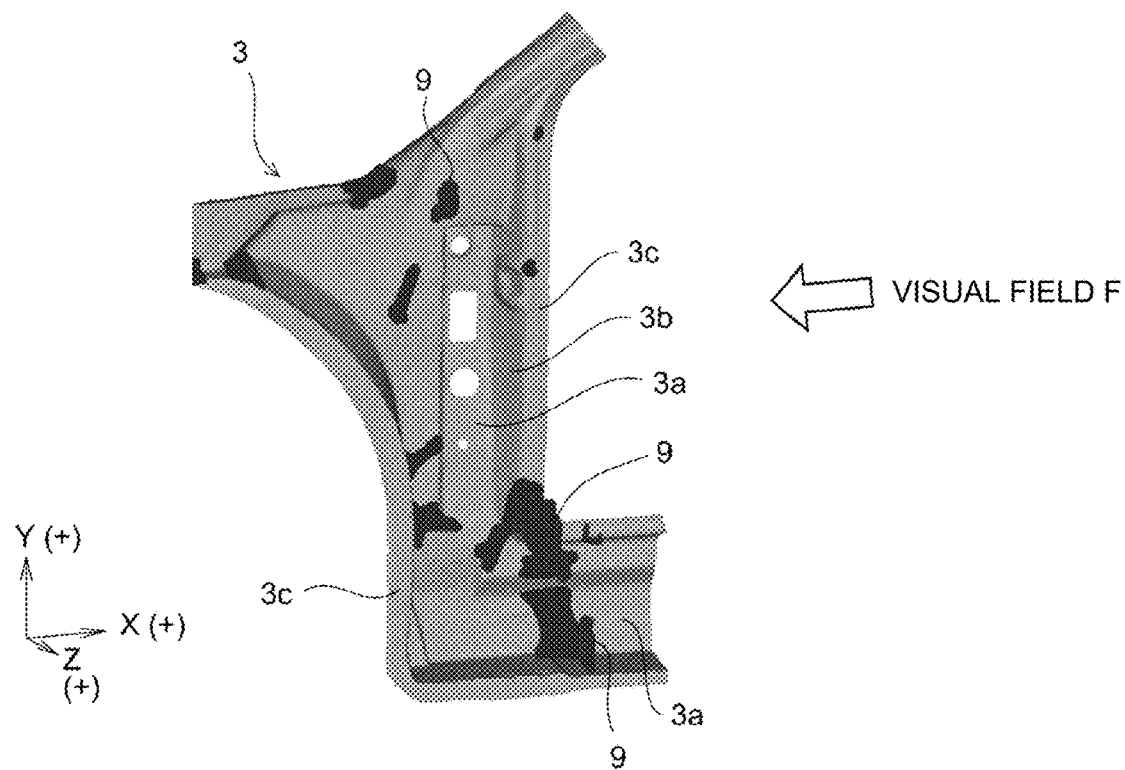
FIG. 7 is a perspective view of the stiffening member in the automotive frame part according to the present embodiment, illustrating an example of an analysis result of the shape optimization analysis.
Figure 8:
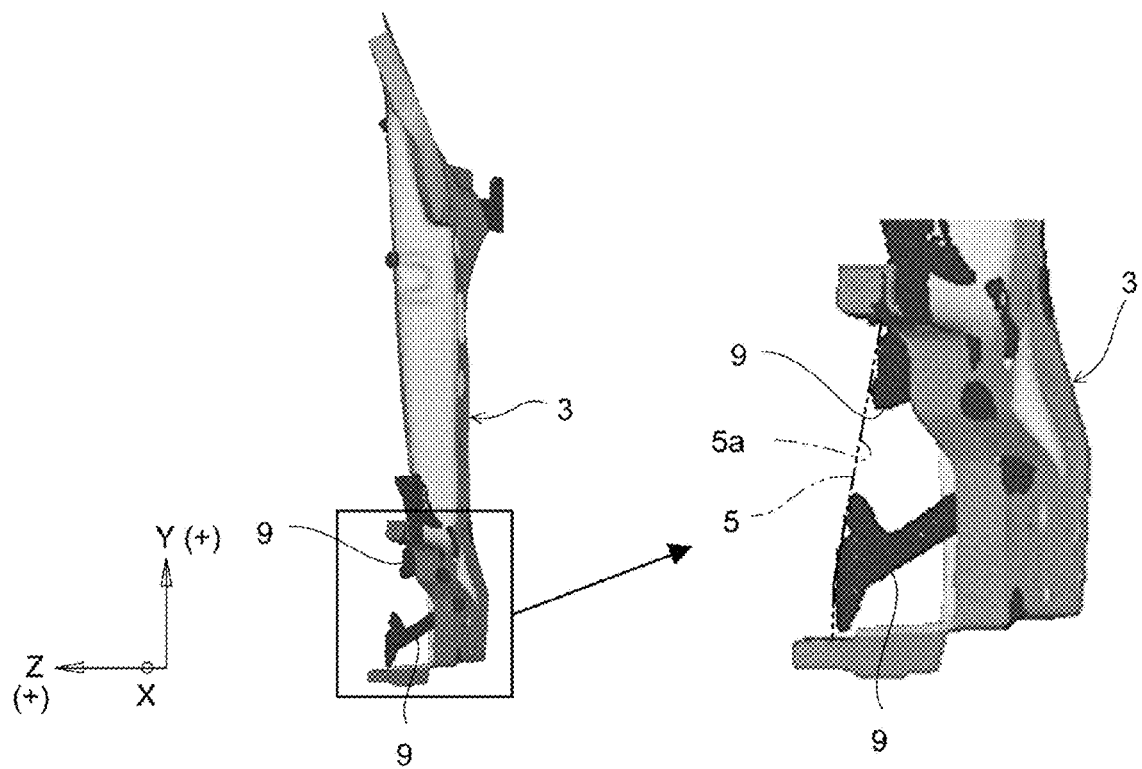
FIG. 8 is a side view of the stiffening member in the automotive frame part according to the present embodiment, illustrating an example of an analysis result of the shape optimization analysis.

In this manner, by creating load and constraint conditions, and an objective function and a constraint function as analysis conditions, optimization analysis is performed so as to obtain an optimal shape 9 of a stiffening member model illustrated in FIGS. 7 and 8 as an analysis result.

FIG. 8 is a diagram displayed from a direction of the visual field F illustrated in FIG. 7, illustrating a rear part of the outer panel 3 in a state where a rear side of the outer panel 3 (front of FIG. 8) in the front-back direction of an automobile (x-axis) is tilted (see the x-axis direction in FIG. 8) to an indoor side in a width direction of the automobile (plus direction of z-axis).

As described above, the stiffening members 7 illustrated in FIGS. 1 and 2 are set based on the optimal shape 9 of a stiffening member model serving as an analysis result of shape optimization analysis, and the optimal shape 9 is formed of three-dimensional elements that remain in a columnar shape in a space formed between the outer panel and the inner panel. With the stiffening members 7 the shape and the position of which are set based on the optimal shape 9, bridge structure is formed in a space between the outer panel 3 and the inner panel 5. The bridge structure is formed in a cylindrical shape having a thin central part and being bulging toward both ends connecting the outer panel 3 and the inner panel 5 or a femur-shaped shape that is a column having a flat cross section so as to improve stiffness of the A-pillar-lower 1.

The topology optimization can be applied to optimization analysis at optimization analysis step S9. In addition, when the solid isotropic material with penalization method is applied in the topology optimization, it is preferable that discretization be performed by setting a penalty coefficient of an element to 2 or more.

Understandably, for optimization analysis at optimization analysis step S analysis processing of optimization can be applied with the other calculation system. Examples of a method for performing analysis processing of optimization can include use of commercially available analysis software using a finite element method.

As described above, the automotive frame parts according to the present embodiment can reduce deformation when a load acts on the automotive frame parts and improve stiffness of the automotive frame parts by providing plastic stiffening members the shape and the disposition of which are set based on an analysis result of shape optimization analysis in a space formed between an outer panel and an inner panel.

In addition, the automotive frame parts according to the present embodiment can reduce weight while maintaining stiffness by providing stiffening members in a space formed between an outer panel and an inner panel and reducing the sheet thickness of the outer panel and the inner panel. This point is demonstrated in a first embodiment, which will be described later.

The A-pillar-lower 1 according to the present embodiment sets an objective function for maximizing stiffness at an evaluation position, and sets the shape and the disposition of the stiffening members 7 illustrated in FIGS. 1 and 2 based on a result obtained by performing shape optimization analysis under a constraint function for setting a volume constraints rate. Another embodiment of the automotive frame parts corresponding to the A-pillar-lower according to the present embodiment may be an A-pillar-lower 31 in which stiffening members 33 having the shape and the disposition illustrated as one example in FIGS. 15 and 16 are set.

Figure 15:
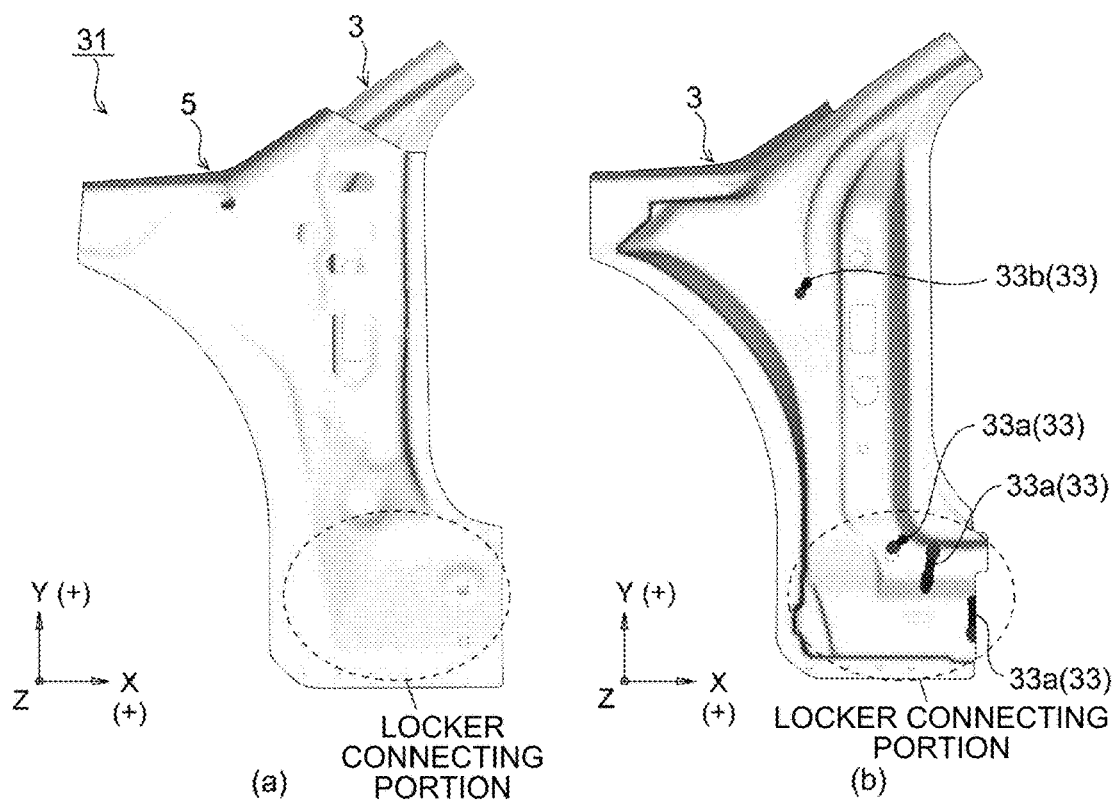
FIG. 15 is a side view of an automotive frame part in accordance with another embodiment of the embodiment of the present invention.
Figure 16:
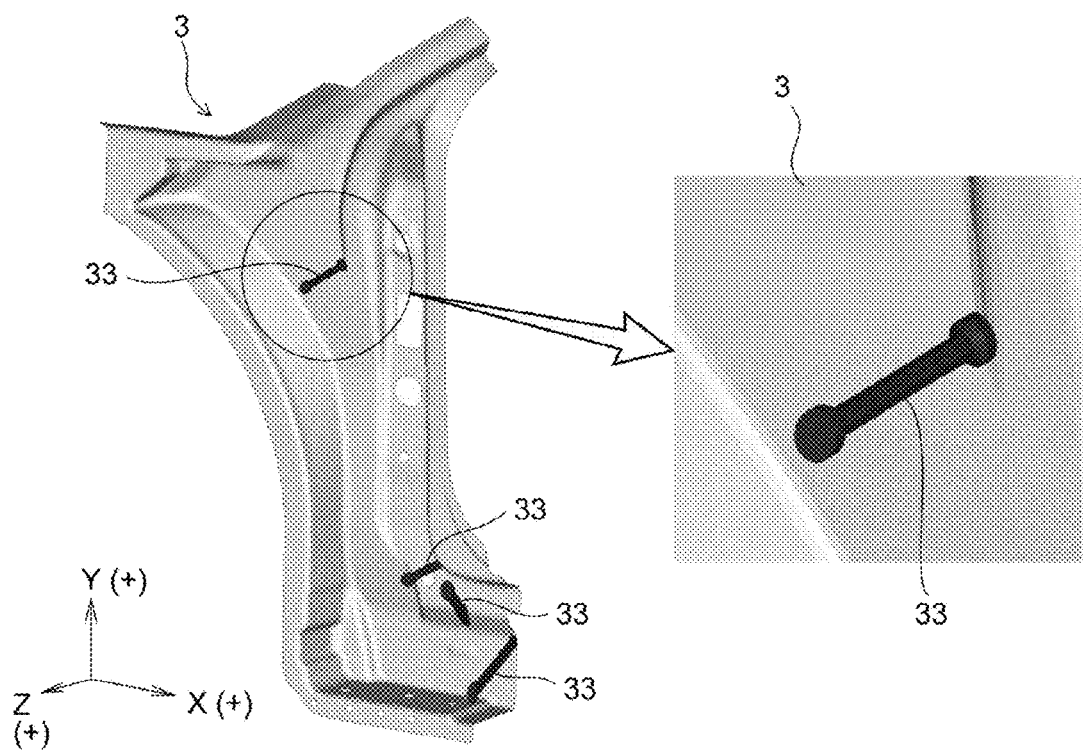
FIG. 16 is a perspective view of an automotive frame part in accordance with another embodiment of the embodiment of the present invention.
Figure 17:
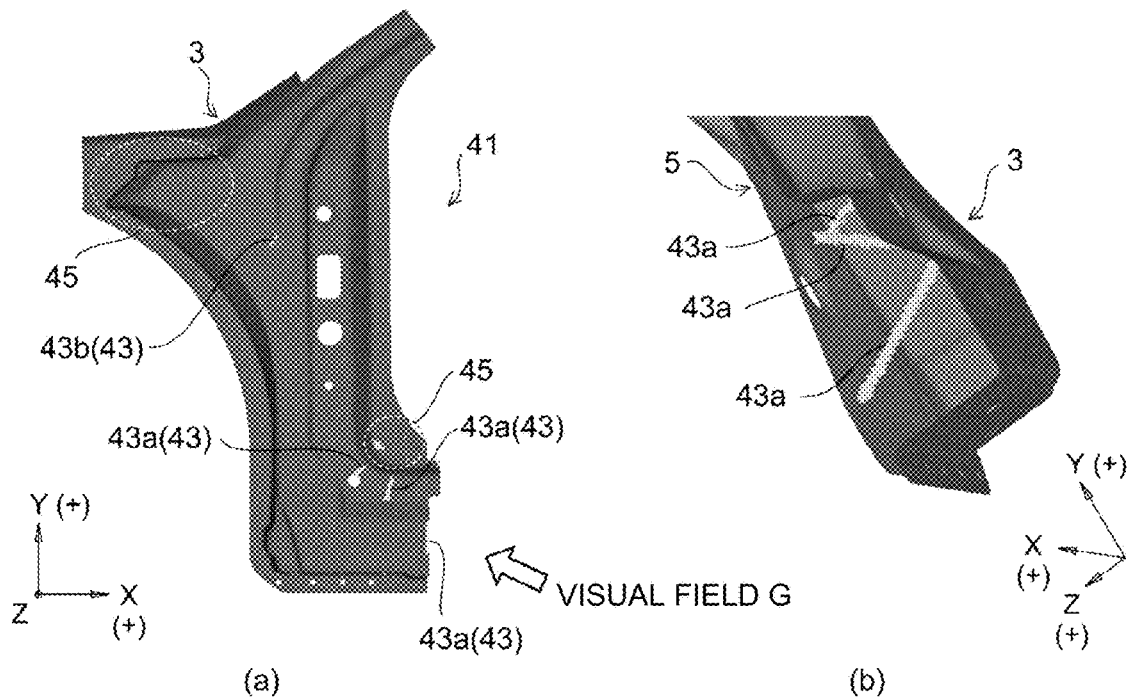
FIG. 17 is a perspective view of a stiffening member of the automotive frame part according to another embodiment of the present embodiment, illustrating an example of an analysis result of shape optimization analysis.

Using the solid isotropic material with penalization method of the topology optimization as a shape optimization analysis method, the shape and the disposition of the stiffening members 33 illustrated in FIGS. 15 and 16 are set based on an optimal shape 41 (FIG. 17) of a stiffening member model obtained by setting an objective function for minimizing volume and maximizing stiffness of the stiffening member model and giving a constraint function for setting a predetermined displacement amount at an evaluation position. FIG. 17A illustrates the outer panel 3 in which the stiffening members 33 are disposed in planar view, and FIG. 17B illustrates a space formed of the outer panel 3 and the inner panel 5 from a direction of a visual field G in FIG. 17A.

The optimal shape 41 of a stiffening member model illustrated in FIG. 17 includes a columnar portion 43 that remains in a columnar shape in a space formed between the outer panel 3 and the inner panel 5, and a flange remaining portion 45 (dotted part in FIG. 17A) that remains in the flange portion connecting the outer panel 3 with the inner panel 5. In addition, the columnar portion 43 includes a columnar portion 43a located at the locker connecting portion in the space and a columnar portion 43b located at a part above the central part of the A-pillar-lower 31 in a height direction.

As illustrated in FIG. 15, the A-pillar-lower 31 has stiffening members 33a a disposed at the locker connecting portion based on the columnar portion 43a of the optimal shape 41 and stiffening members 33b disposed at a part above the central part of the A-pillar-lower 31 in a height direction based on the columnar portion 43b. Because the columnar portion 43 in the optimal shape 41 does not have a shape with both end parts bulging as illustrated in FIG. 17B, each of the stiffening members 33 has a dumbbell-like shape that is a columnar shape with both end parts extended (bulging) as illustrated in FIG. 16 in order to have installation property and durability itself.

As described above, when automotive frame parts are stiffened, haphazardly providing partition wall structure as stiffening parts causes weight to be increased and is unfavorable. When a load is input to automotive frame parts, there is a key point that is easily deformed in the deformation of the automotive frame parts. By disposing and pressing stiffening members on the point, weight of the whole automotive frame parts can be prevented from being increased and stiffness can be increased. In particular, a part above the central part of the A-pillar-lower 31 in a height direction is, when a load is input so as to cause deformation, considered to be a part where the outer panel 3 and the inner panel 5 are most easily bulging in an automotive body width direction. Thus, it is assumed that the shape optimization analysis provided a result that the columnar portion 43b remains at a part above the central part of the A-pillar-lower 31 in a height direction.

As above, by disposing the dumbbell-like stiffening members 33 at a most important point for deformation upon input of a load, stiffness can be improved without an increase in weight caused by disposition of the stiffening members. In addition, even when the outer panel 3 and the inner panel 5 are thinned (sheet thickness is reduced) to reduce weight, high stiffness can be achieved. The shape optimization analysis method for setting the shape and the disposition of the stiffening members 33 illustrated in FIGS. 15 and 16, and improvement of stiffness by the stiffening members 33 and weight reduction when the sheet thickness of the outer panel 3 and the inner panel 5 is reduced will be described in a second embodiment, which will be described later.

First Embodiment

With the automotive frame parts according to the present invention, experiments for examining effects of improvement of stiffness and weight reduction were performed. The following describes the experiments.

In the first embodiment, as the automotive frame parts, the A-pillar-lower 1 in which the stiffening members 7 illustrated in FIGS. 1 and 2 were set based on the optimal shape 9 of a stiffening member model illustrated in FIGS. 7 and 8 was defined as an example, and stiffness and weight reduction of the A-pillar-lower 1 were evaluated.

The A-pillar-lower 1 according to a first example is formed by combining the outer panel 3 with the inner panel 5, and the outer panel 3 and the inner panel 5 are manufactured by press forming a hot-dip galvannealed steel sheet having tensile strength of 440 MPa class and a sheet thickness of 1.0 mm.

The shape and the disposition of the stiffening members 7 (FIG. 2) were set based on an analysis result (optimal shape 9 in FIGS. 7 and 8) obtained by the shape optimization analysis method (see FIG. 5) described in the above embodiment. The stiffening members 7 were manufactured by injection molding. Glass fiber reinforced plastic was defined as the material of the stiffening members 7 (glass fiber reinforced nylon, glass fiber content of 25%, elastic modulus of 7 GPa).

As a constraint function in the shape optimization analysis, a topology remaining rate (volume constraints rate) was set to 5%.

Using the same stiffening members 7 as those in the first example, the aluminum die cast outer panel 3 having a thickness of 2.0 mm and the inner panel 5 obtained by press forming a hot-dip galvannealed steel sheet having tensile strength of 440 MPa class and a sheet thickness of 1.0 mm are defined as a second example.

Figure 9:
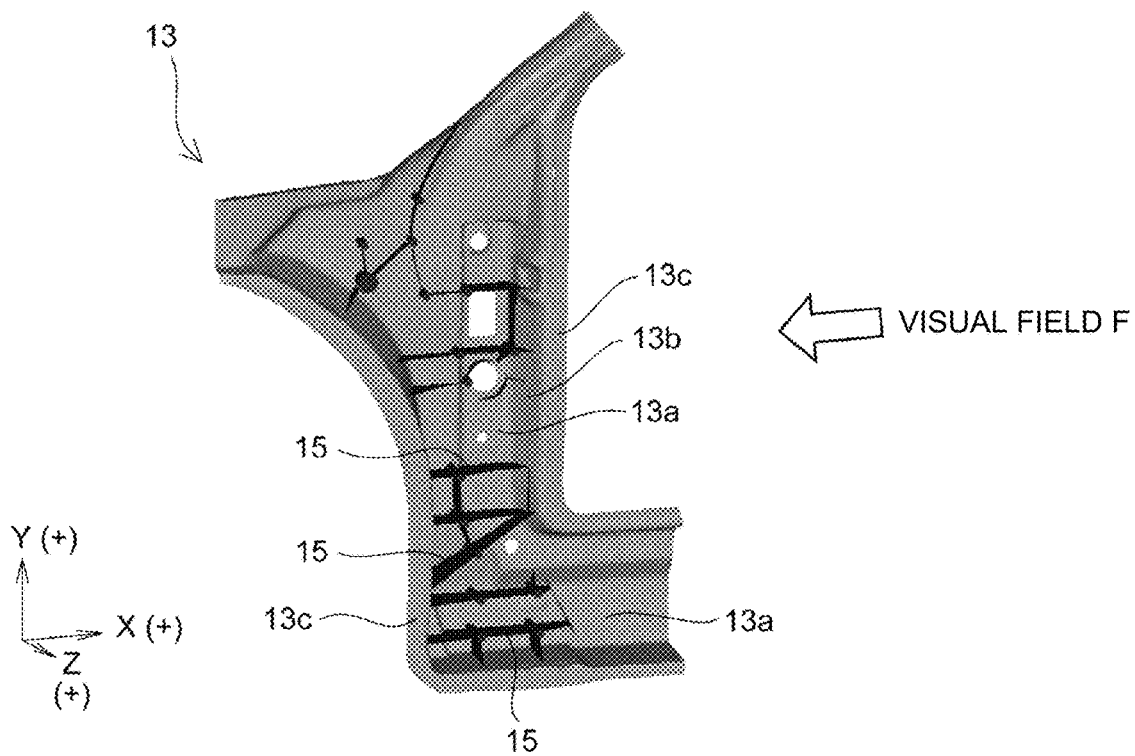
FIG. 9 is a perspective view of an automotive frame part of first and third comparison examples serving as comparison targets in a first embodiment.
Figure 10:
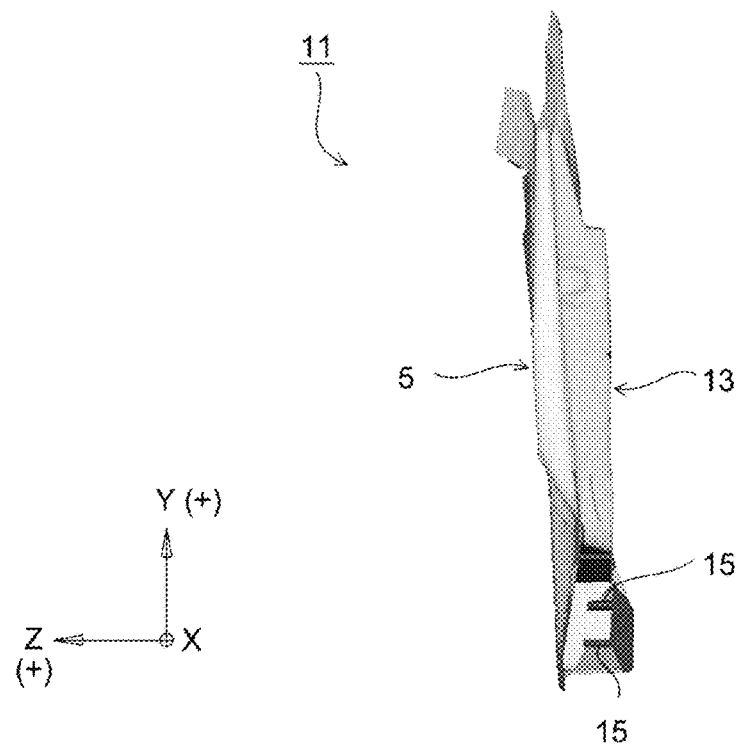
FIG. 10 is a side view of the automotive frame part in accordance with the first and third comparison examples serving as comparison targets in the first embodiment.
Figure 11:
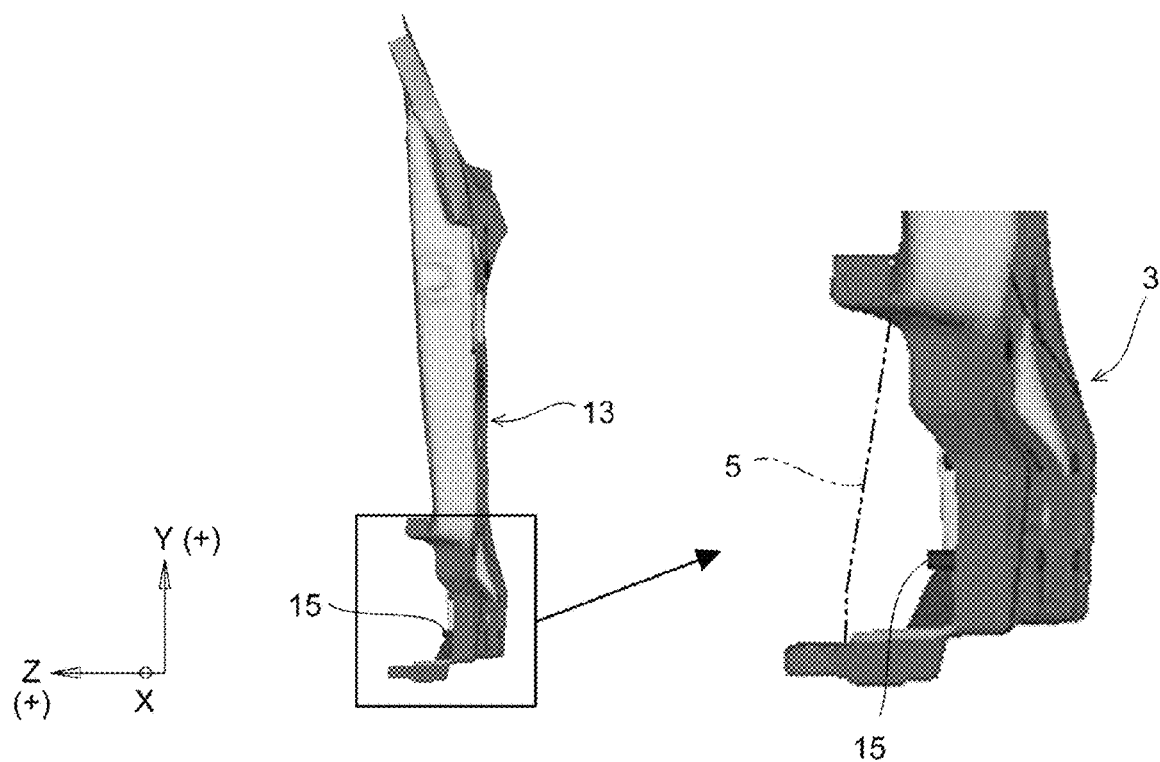
FIG. 11 is a view of the automotive frame part in accordance with the first and third comparison examples serving as comparison targets in the first embodiment.
Figure 12:
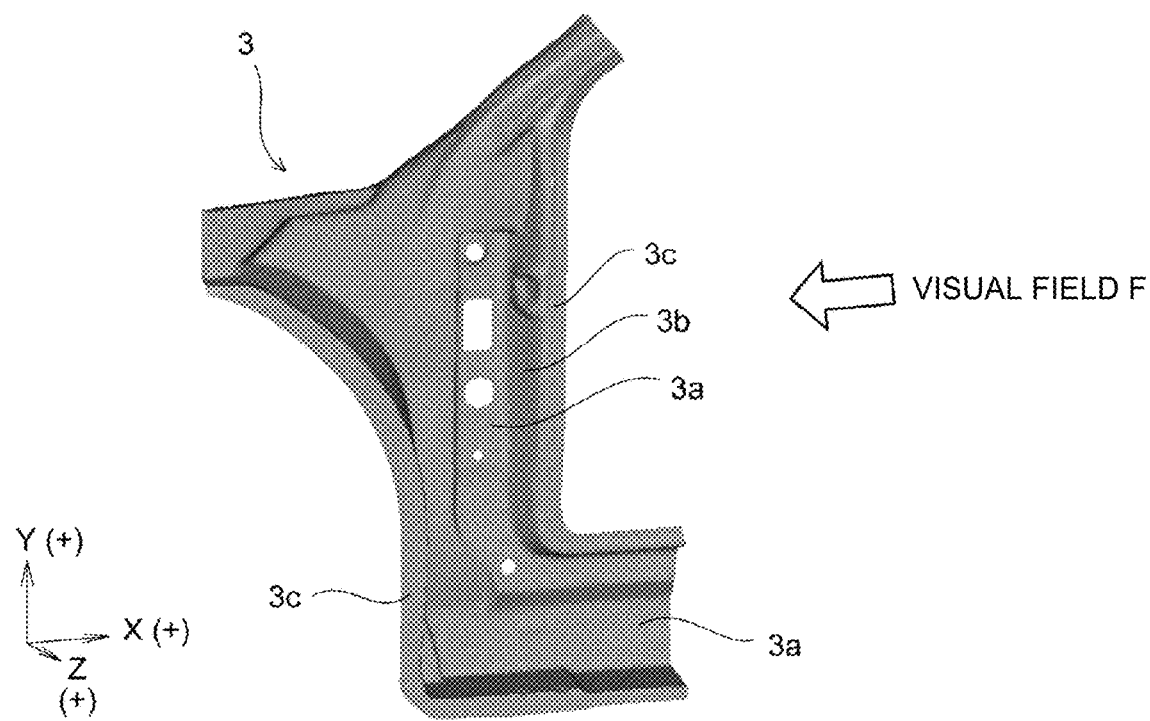
FIG. 12 is a perspective view of the outer panel used for the automotive frame part in accordance with a second comparison example serving as a comparison target in the first embodiment.
Figure 13:
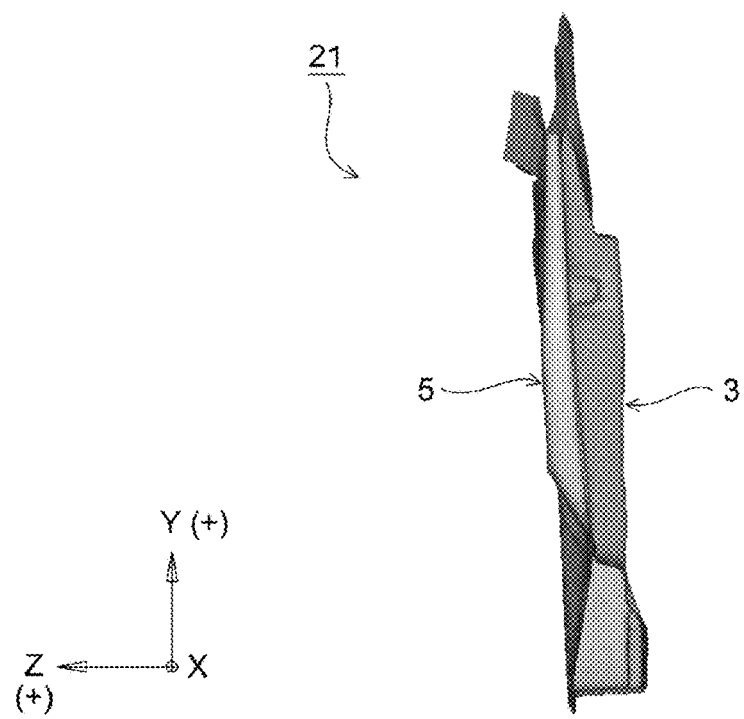
FIG. 13 is a side view of the automotive frame part in accordance with the second comparison example serving as a comparison target in the first embodiment.
Figure 14:
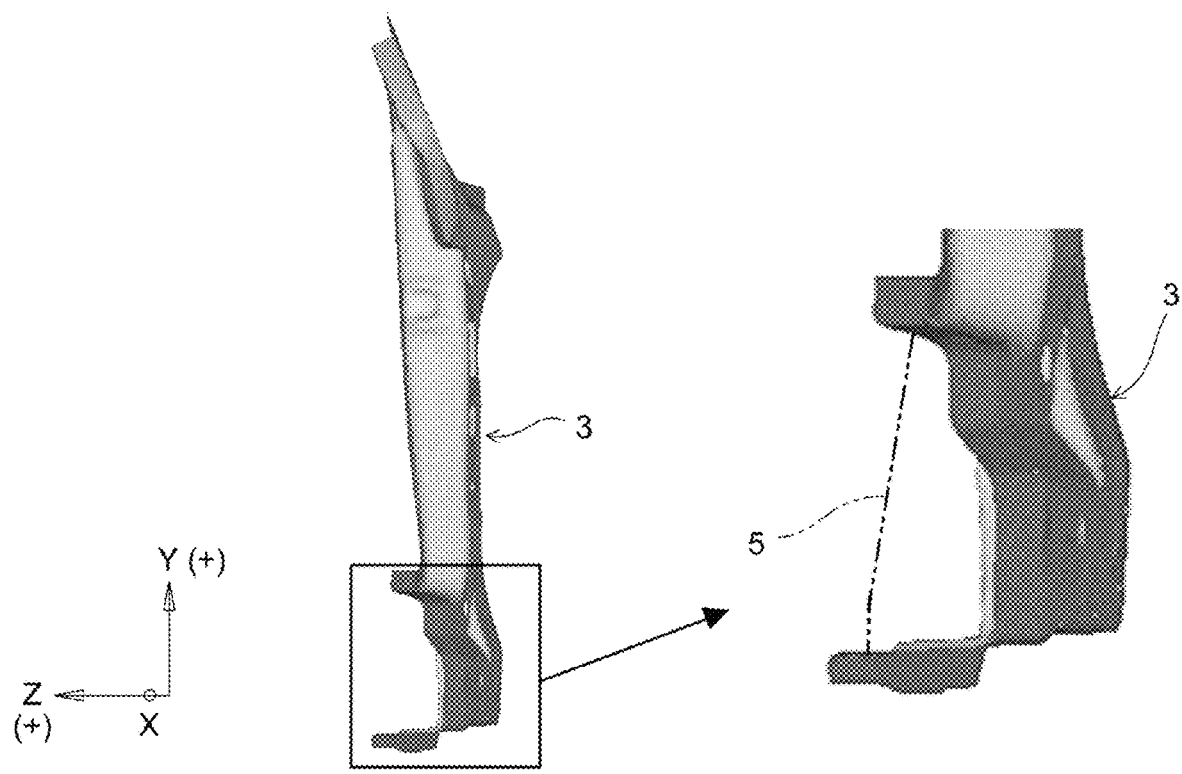
FIG. 14 is a diagram for explaining the automotive frame part in accordance with the second comparison example serving as a comparison target in the first embodiment.

In the first embodiment, as comparison targets, an A-pillar-lower 11 that was formed of an outer panel 13 and the inner panel 5 manufactured by aluminum die casting and has a rib 15 as a stiffening member provided to the outer panel 13 was defined as a first comparison example as illustrated in FIGS. 9 to 11, and an A-pillar-lower 21 that was formed of the outer panel 3 and the inner panel 5 manufactured by press forming a steel sheet having tensile strength of 440 MPa class similarly to the example and has no stiffening member provided was defined as a second comparison example as illustrated in FIGS. 12 to 14. As the rib 15 of the first comparison example, a height less than the depth of the outer panel 3 in an automotive body longitudinal direction, a height direction, and an automotive width direction was defined as a rib height and a commercially available actual automobile was referred to for a disposed position of the rib 15.

In addition, an A-pillar-lower (see FIGS. 9 to 11) that was formed of the outer panel 3 and the inner panel 5 obtained by press forming a steel sheet similarly to the second comparison example and that has a plastic member bonded to the outer panel 3 was defined as a third comparison example, the plastic member having the same shape as that of the aluminum rib 15, which is provided on the outer panel 13 of the first comparison example. A case where the rib 15 was not included in the first comparison example was defined as a fourth comparison example.

The outer panel 13 according to the first and third comparison examples has a hat-like cross section including a top portion 13a, a side wall portion 13b, and a flange portion 13c. The inner panel 5 is connected to the flange portion 13c of the outer panel 13.

FIG. 11 is a view of the A-pillar-lower 11 from a direction of the visual field F illustrated in FIG. 9, illustrating a rear part of the A-pillar-lower 11 in a state where a rear side of the A-pillar-lower 11 in the front-back direction of an automobile (x-axis) is tilted to an indoor side in a width direction of the automobile (plus direction of z-axis).

Similarly to FIG. 11, FIG. 14 illustrates the A-pillar-lower 21 in a state where the A-pillar-lower 21 is tilted from a direction of the visual field F illustrated in FIG. 12 to a z-axis direction.

Table 1 shows materials of the outer panel, the inner panel, and the stiffening members used in the first and second examples and the first to fourth comparison examples.

TABLE 1

| | Outer panel/Inner panel | | | | | Stiffening member | |
|---|---|---|---|---|---|---|---|
| | Material | Young's modulus/ GPa | Sheet thickness/ mm | Molding method | Weight/ kg | Material | Young's modulus/ GPa |
| First example | Steel/Steel | 210/210 | 1.0/1.0 | Press/Press | 3.37 | GFRP | 7 |
| Second example | Al/Steel | 70/210 | 2.0/1.0 | Die-casting/Press | 2.49 | GFRP | 7 |
| First comparison example | Al/Al | 70/70 | 3.0/3.0 | Die casting/Die casting | 3.74 | Al | 70 |
| Second comparison example | Steel/Steel | 210/210 | 1.2/1.0 | Press/Press | 4.05 | — | — |
| Third comparison example | Steel/Steel | 210/210 | 1.0/1.0 | Press/Press | 3.37 | GFRP | 7 |
| Fourth comparison example | Al/Al | 70/70 | 2.0/2.0 | Die casting/Die casting | 2.49 | — | — |

| | Stiffening member | | | Evaluation position | Total | Weight reduction rate/% (Reference: First |
|---|---|---|---|---|---|---|
| | Thickness/ mm | Topology optimization | Molding method | Weight/ kg | Displacement amount/mm | weight/ kg | comparison example) |
| First example | 2.0 | ○ | Injection molding | 0.11 | 0.4 | 3.48 | 26 |
| Second example | 2.0 | ○ | Injection molding | 0.11 | 0.5 | 2.60 | 45 |
| First comparison example | 1.5 | x | Die casting | 0.97 | 0.5 | 4.71 | 0 |
| Second comparison example | — | — | — | — | 8.6 | 4.05 | 14 |

TABLE 1-continued

| Third comparison example | 2.0 | x | Injection molding | 0.57 | 1.5 | 3.94 | 16 |
| Fourth comparison example | — | — | — | — | 12.5 | 2.49 | 47 |

In Table 1, "o" in the column of the shape optimization indicates that the stiffening members 7 set based on an analysis result of the shape optimization analysis are used, and "x" indicates that stiffening members have the same shape as the rib 15 (see FIG. 9).

In the column of the molding method in Table 1, injection molding indicates that plastic stiffening members are molded by injection molding and the molded stiffening members are bonded to the outer panel by an adhesive, and die casting indicates the outer panel 13 (see FIG. 9) with which the rib 15 is integrally molded.

In the first embodiment, stiffness of the automotive frame parts was evaluated below.

For the A-pillar-lower according to the examples and the comparison examples, the respective analysis models were generated, and load and constraint conditions illustrated in FIG. 6 were given to the analysis models to perform computer aided engineering (CAE) analysis. Similarly to the load and constraint conditions in shape optimization analysis described in the above embodiment, load and constraint conditions illustrated in FIG. 6 indicate that the bottom surface of a connecting portion between the A-pillar-lower and a locker was fully constrained, and a load of 1,000N was applied to the tip of a front-end part of the A-pillar-lower downward in a vertical direction (y-axis minus direction in FIG. 6).

A displacement amount in a y-axis direction at an evaluation position (see FIG. 6) when the load and constraint conditions were given was acquired and the magnitude of the displacement amount was compared to evaluate stiffness.

Regarding weight reduction of the automotive frame parts, weight of the A-pillar-lower 11 according to the first comparison example (hereinafter referred to as "reference weight") was used as a reference. A weight reduction rate was calculated by dividing a difference between the respective weight of the A-pillar-lowers according to the examples and the comparison examples and the reference weight by the reference weight.

Table 1 listed as above shows a displacement amount at an evaluation position, and weight and a weight reduction rate of the A-pillar-lower.

In the first comparison example, both the outer panel 13 and the inner panel 5 having a thickness of 3.0 mm are manufactured by aluminum die casting, and the rib 15 (thickness 1.5 mm) is integrally molded with the outer panel 13.

The displacement amount at an evaluation position was 0.5 mm, and the total weight of the whole A-pillar-lower 11 was 4.71 kg.

The first example indicates that the displacement amount decreases from that of the first comparison example and stiffness is improved. By using a steel sheet having a sheet thickness of 1.0 mm for the outer panel 3 and the inner panel 5, weight of the outer panel 3 and the inner panel 5 was 3.37 kg, and was lighter than weight of the outer panel 13 and the inner panel 5 (3.74 kg) in the first comparison example. In addition, because the plastic stiffening members 7 (thickness 2.0 mm) were used in the first example, weight of the stiffening members 7 was reduced (0.97 kg to 0.11 kg) as compared with the first comparison example. The result showed that the total weight of the A-pillar-lower 1 was 3.48 kg and the weight reduction rate was 26%. Thus, weight reduction was achieved without reducing stiffness (without increasing a displacement amount) as compared with the first comparison example.

In addition, by applying aluminum, the second example could reduce more weight without reducing stiffness.

Because the second comparison example uses the outer panel 3 and the inner panel 5 obtained by press forming a steel sheet having a sheet thickness of 1.2 mm, weight is increased from that of the aluminum die-cast outer panel 13 and the inner panel 5 in the first comparison example. But the second comparison example is not provided with stiffening members, and the A-pillar-lower 21 achieves a weight reduction rate of 14% as compared with the first comparison example. However, the displacement amount at the evaluation position that was 8.6 mm was significantly increased, thereby significantly reducing stiffness.

Similarly to the first example, the third comparison example uses the outer panel and the inner panel obtained by press forming a steel sheet having a sheet thickness of 1.0 mm, and further adheres a GFRP rib having the same shape as a rib shape of the first comparison example to the outer panel. The total weight of the A-pillar-lower was 3.94 kg, and a weight reduction rate of 16% was achieved as compare with the first comparison example. The displacement amount at an evaluation position was reduced from 8.6 mm to 1.5 mm as compared with the second comparison example and improvement of stiffness was recognized. However, the displacement amount was larger as compared with 0.5 mm of the first comparison example, thereby reducing stiffness.

The fourth comparison example shows an evaluation result of only a body (no rib 15) of the first comparison example. In the fourth comparison example, use of aluminum enables weight to be significantly reduced, but the displacement amount was significantly increased because of low Young's modulus and stiffness was reduced.

As above, the automotive frame parts according to the present invention has demonstrated achievement of both improvement of stiffness and weight reduction by providing plastic stiffening members the shape and the position of which are set based on an analysis result of the shape optimization analysis method to a space formed of the outer panel and the inner panel.

In addition, the automotive frame parts according to the present invention uses a steel sheet. Thus, the automotive frame parts are superior in terms of assembling property and cost as compared with aluminum die-cast automotive frame parts.

Second Embodiment

Similarly to the first embodiment described above, with the automotive frame parts according to the present invention, experiments for examining effects of improvement of stiffness and weight reduction were performed. The following describes the experiments.

In the second embodiment, the shape and the disposition of the stiffening members 33 illustrated in FIGS. 15 and 16 were set based on an analysis result of shape optimization analysis, and stiffness and weight reduction of the A-pillar-lower 31 to which the stiffening members 33 are set were evaluated.

The following describes the settings for the shape and the disposition of the stiffening members 33 with the shape optimization analysis method.

Figure 18:
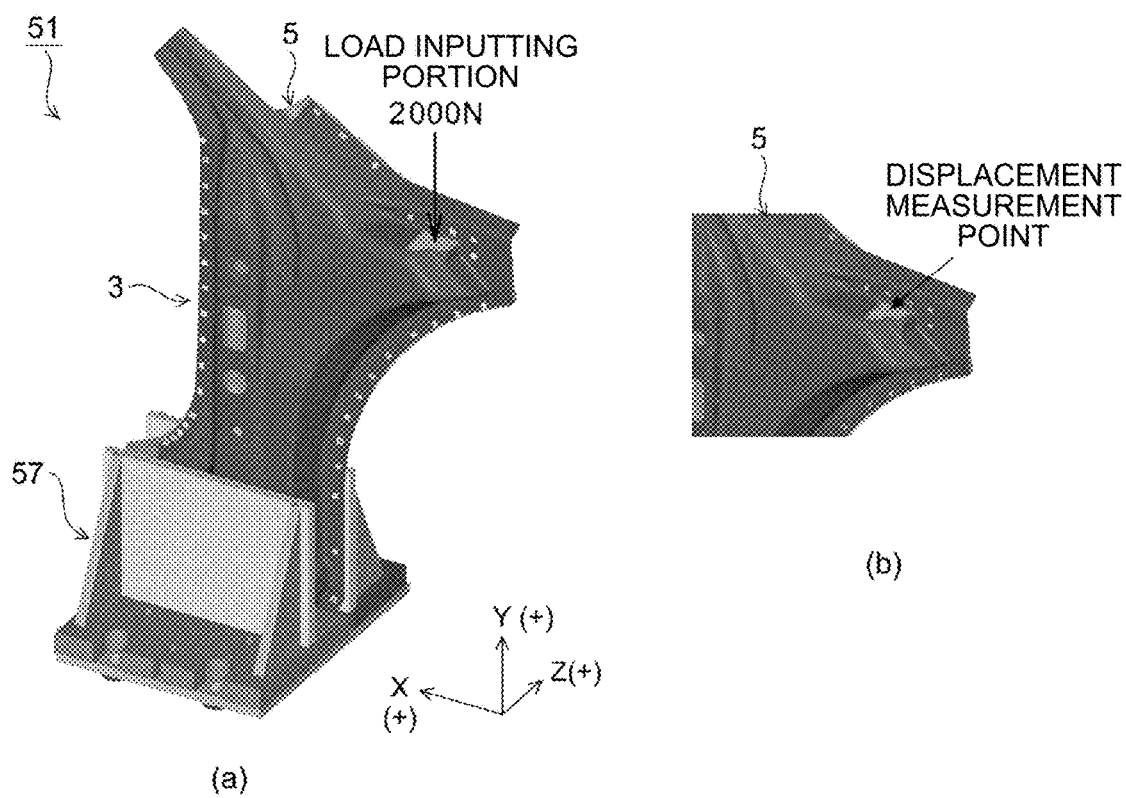
FIG. 18A is a diagram illustrating load and constraint conditions in shape optimization analysis of the stiffening members and FIG. 18B is a diagram illustrating a displacement measurement point in stiffness evaluation in a second embodiment.

FIG. 18 illustrates an optimization analysis model 51 in shape optimization analysis. The optimization analysis model 51 sets a design space in a space formed of the outer panel 3 and the inner panel 5, and sets a stiffening member model that is the modeled design space with three-dimensional elements. By sharing a node of three-dimensional elements in a stiffening member model and a node of two-dimensional elements of the outer panel 3 and the inner panel 5, the respective nodes are linked to each other so as to transmit a load from the outer panel 3 and the inner panel 5 to the stiffening member model.

The material of both the outer panel 3 and the inner panel 5 as defined as a steel sheet having tensile strength of 440 MPa class and a sheet thickness of 0.8 mm. The material of the stiffening member model was defined as plastic having the material property illustrated in Table 2.

TABLE 2

|  | Young's modulus (GPa) | Poisson's ratio | Specific gravity |
|---|---|---|---|
| Steel | 206 | 0.3 | 7.85 |
| Plastic | 4 | 0.3 | 1.37 |

Because the shape optimization analysis using the optimization analysis model 51 targets stiffness of bending input from a suspension part in an automobile, as illustrated in FIG. 18A, a lower part of the optimization analysis model 51 was constrained by a jig 57, and load and constraint conditions for inputting a load of 2,000 N downward to the height direction (y-axis minus direction) to a load inputting portion provided to an upper part of the optimization analysis model 51 were given.

By using the solid isotropic material with penalization method of the topology optimization as a shape optimization analysis method, an objection function for minimizing volume and maximizing stiffness of a stiffening member model was set and a constraint function for setting a displacement amount of 0.5 mm in y-axis minus direction at a displacement measurement point illustrated in FIG. 18B was given. The displacement measurement point was set to the same position as the load inputting portion (FIG. 18A) set as load and constraint conditions.

The shape optimization analysis was performed under the load and constraint conditions, the objective function, and the constraint function set as above to obtain the optimal shape 41 of the stiffening member model illustrated in FIG. 17 described above.

The optimal shape 41 includes the columnar portion 43 that remains in a columnar shape in a space formed between the outer panel 3 and the inner panel 5, and the flange remaining portion 45 that remains in the flange portion connecting the outer panel 3 with the inner panel 5. The columnar portion 43 includes the columnar portion 43a that remains at the locker connecting portion (portion with which a side sill is combined) in the space and a columnar portion 43b that remains at a part above the central part of the A-pillar-lower 31 in a height direction.

The following describes stiffening members the shape and the disposition of which are set based on a result of shape optimization analysis and evaluation of stiffness and weight reduction of the A-pillar-lower provided with the stiffening members.

In the second embodiment, the A-pillar-lower 31 in which the shape and the disposition of the stiffening members 33 were set based on the optimal shape 41 of the stiffening member model illustrated in FIG. 17 was defined as eleventh and twelfth examples.

Figure 19:
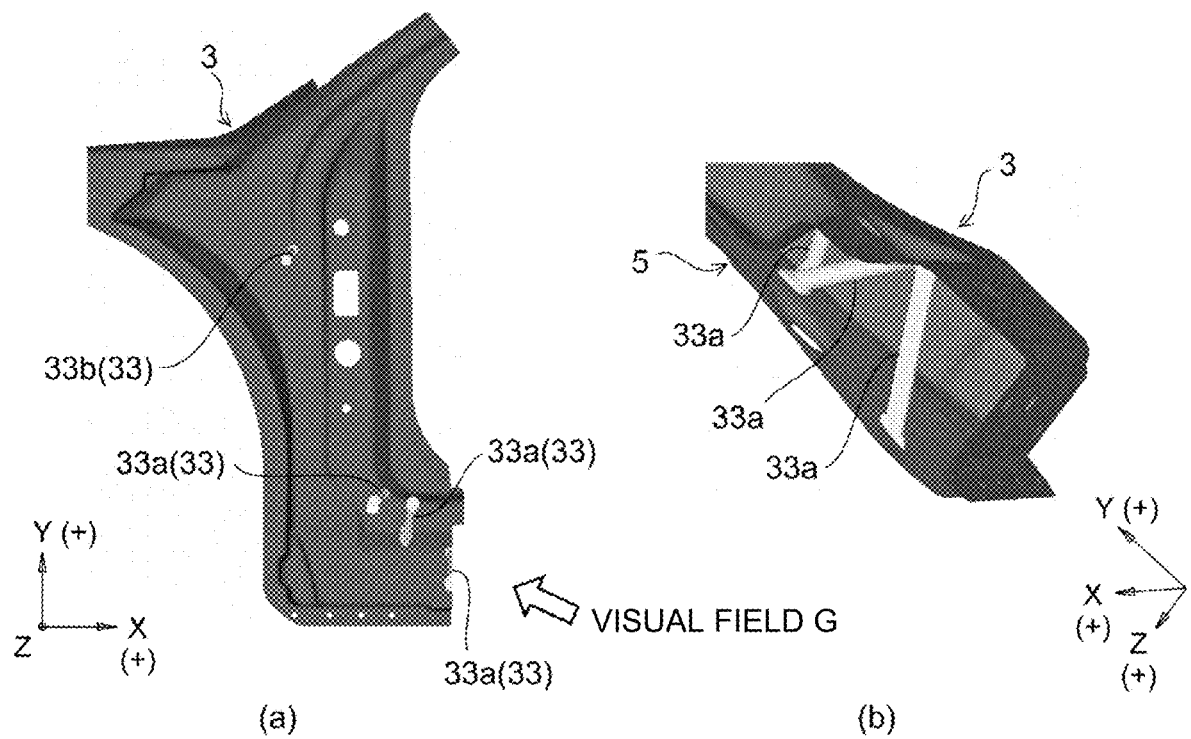
FIG. 19 is a perspective view of the automotive frame part according to first and second examples in the second embodiment.

In the eleventh example, about the columnar portion 43a at the locker connecting portion (see FIG. 15) and the columnar portion 43b at a part above the central part in a height direction in the optimal shape 41, the dumbbell-like stiffening members 33a and 33b that are modeled by a computer-aided design (CAD) and have both end parts bulging in a disk shape as illustrated in FIG. 19 were set.

By contrast, in the twelfth example, in addition to the stiffening members 33a and 33b having the same shape and disposition as those of the eleventh example, the outer panel 3 and the inner panel 5 were further bonded to each other by an adhesive with respect to a position of the flange remaining portion 45 that remained in the flange portion connecting the outer panel 3 with the inner panel 5 in the shape optimization analysis as illustrated in FIG. 17.

Furthermore, in the second embodiment, the A-pillar-lower that has the optimal shape 1 of a stiffening member model illustrated in FIG. 17 was defined as a thirteenth example. Similarly to the eleventh and twelfth examples, stiffness and weight reduction of the thirteenth example were evaluated.

Figure 20:
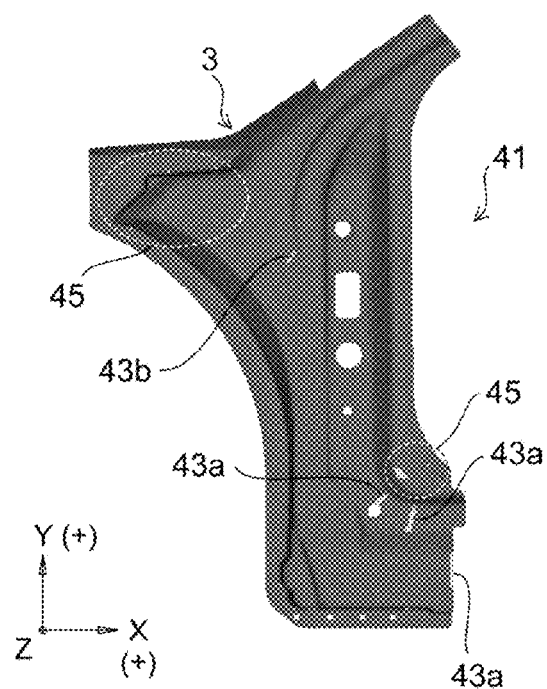
FIG. 20 is a side view of the automotive frame part according to a thirteenth example in the second embodiment.

In the thirteenth example, a stiffening member model of the four columnar portions 43a and 43b that remained in a columnar shape in the optimal shape 41 was defined as illustrated in FIG. 20. FIG. 20 does not illustrate the inner panel 5 forming the A-pillar-lower and illustrates the columnar portions 43a and 43b and the flange remaining portion 45 on the outer panel 3.

In the second embodiment, stiffness of the automotive frame parts was evaluated below.

The respective analysis models for evaluating stiffness for the eleventh, twelfth, and thirteenth examples were generated, load and constraint conditions illustrated in FIG. 18 were given to the analysis models, and CAE analysis was performed to obtain a displacement amount downward in a vertical direction (y-axis minus direction in FIG. 18) at a displacement measurement point (FIG. 18B) that was provided to the tip of a front-end part of the A-pillar-lower. Similarly to the load and constraint conditions in the shape optimization analysis described above, in the load and constraint conditions illustrated in FIG. 18, the locker connecting portion to which a locker was connected was fully constrained, and a load of 2,000N was input to the load inputting portion provided to the tip of a front-end part of the A-pillar-lower. A value obtained by dividing a displacement amount at a displacement measurement point by an input load was calculated as a stiffness value.

In the second embodiment, an A-pillar-lower of an outer panel and an inner panel made of an aluminum sheet having a sheet thickness of 3.3 mm was defined as a first conventional example, and a stiffness value was calculated similarly to the above case. For the stiffness of the eleventh and twelfth examples and the thirteenth example, an improvement rate of stiffness (%) using a stiffness value of the first conventional example as a reference and an improvement rate of stiffness (%) per weight that is an improvement rate of stiffness standardized by weight of stiffening members or a stiffening member model were calculated.

In addition, for the eleventh and twelfth examples and the thirteenth example, the respective changes in weight using weight of the A-pillar-lower in the first conventional example as a reference were calculated.

Figure 21:
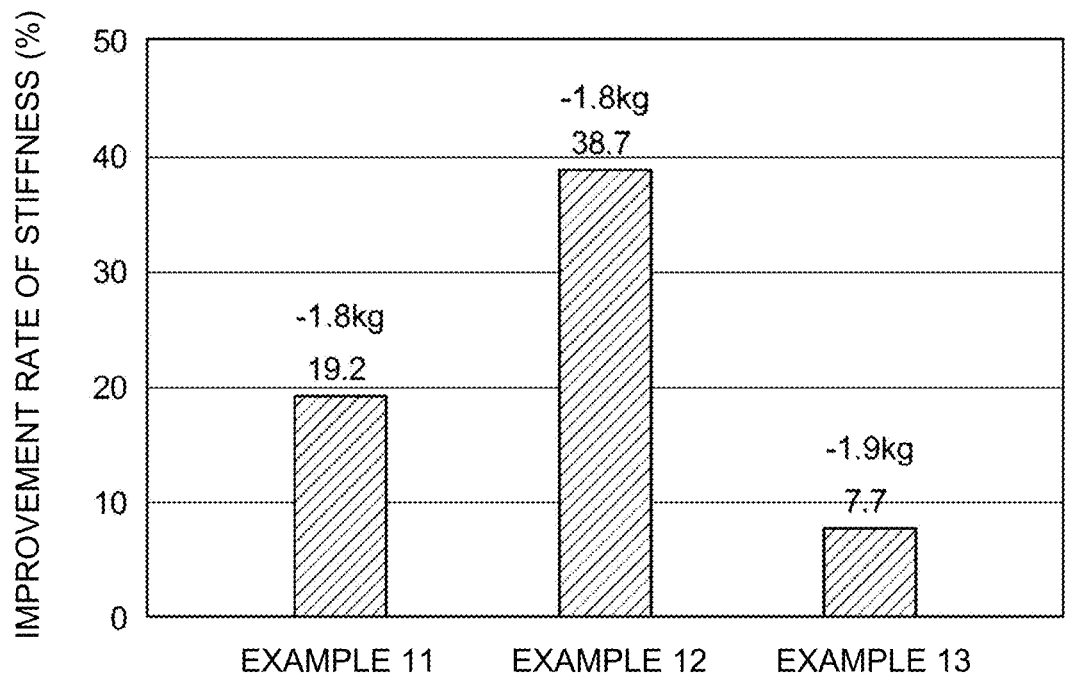
FIG. 21 is a graph illustrating a result of improvement rate of stiffness and a change in weight using the conventional automotive frame parts as a reference in the second embodiment.
Figure 22:
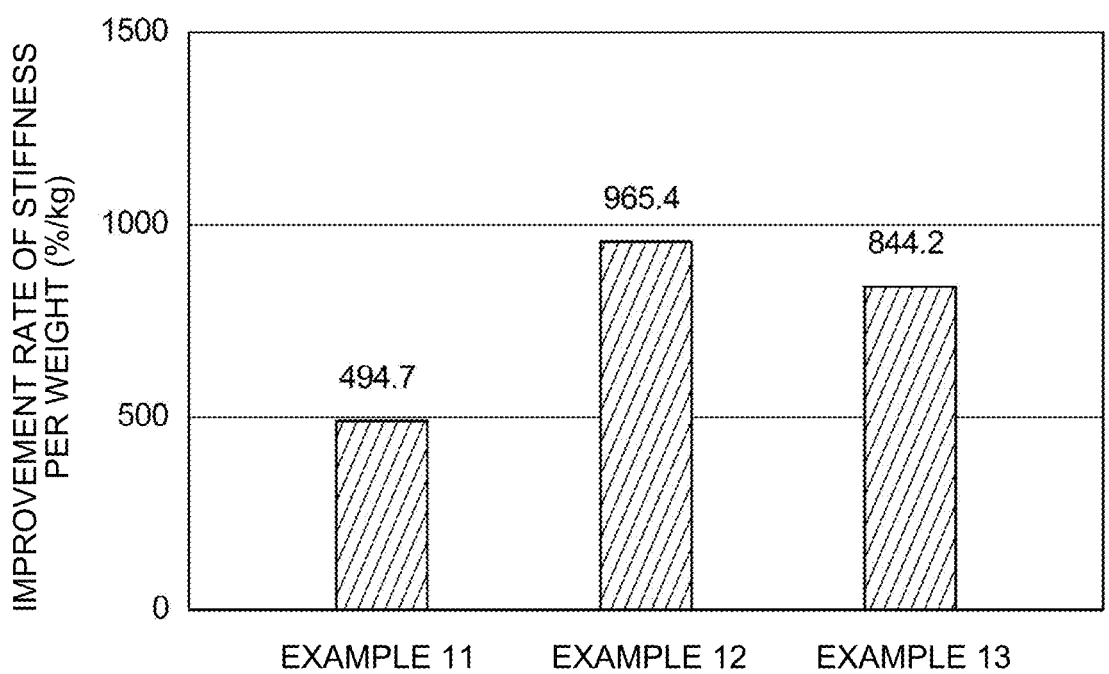
FIG. 22 is a graph illustrating a result of improvement rate of stiffness per weight using the conventional automotive frame parts as a reference in the second embodiment.

FIG. 21 illustrates a result of the improvement rate of stiffness, and FIG. 22 illustrates a result of the improvement rate of stiffness per weight that is an improvement rate of stiffness standardized by weight of stiffening members or a stiffening member model. FIG. 21 also illustrates measured values of a change in weight for each condition.

FIG. 21 indicated that the A-pillar-lower 31 using steel sheets for the outer panel 3 and the inner panel 5 and is provided with the dumbbell-like stiffening members 33 could achieve both improvement of stiffness and weight reduction as compared with the A-pillar-lower of the first conventional example made of an aluminum sheet because the improvement rate of stiffness of both of the eleventh and twelfth examples is a positive value and the change in weight is −1.8 kg.

Subsequently, the result of the eleventh and twelfth examples and the result of the thirteenth example are compared with each other.

When the thirteenth example in which the columnar portions 43a and 43b in the optimal shape 41 were set and the eleventh example in which the stiffening members 33a and 33b were provided based on the columnar portions 43a and 43b are compared with each other, in the eleventh example, a change in weight of the whole A-pillar-lower was changed from −1.9 g to −1.8 kg by forming the stiffening members 33a and 33b into a dumbbell-like shape, and an improvement rate of stiffness per weight was also reduced from 44.2%/kg to 494.7%/kg, but an improvement rate of stiffness was increased from 7.7% to 19.2%.

In the twelfth example in which the stiffening members 33 were provided based on the columnar portion 43 in the optimal shape 41 and the flange portions of the outer panel 3 and the inner panel 5 were further connected by an adhesive based on the flange remaining portion 45, a change in weight of the whole A-pillar-lower was changed from −1.9 g to −1.8 kg by forming the stiffening members 33 into a dumbbell-like shape and an improvement rate of stiffness per weight was also reduced from 2,770.2%/kg to 965.4%/kg. However, an improvement rate of stiffness was increased from 29.1% to 38.7%.

In addition, when a result of the eleventh example and a result of the twelfth examples were compared with each other, in the twelfth example in which the flange portion was further connected based on the flange remaining portion 45 of the optimal shape 41, an improvement rate of stiffness was increased from that of the eleventh example (19.2% to 38.7%).

As above, it has been proved that both improvement of stiffness and weight reduction of an A-pillar-lower can be achieved by providing a dumbbell-like stiffening member at a locker connecting portion and at a part above the central part in a height direction in a space formed of an outer panel and an inner panel based on a result of shape optimization analysis. In addition, it has been proved that an improvement rate of stiffness can be increased more without increasing weight by further connecting an outer panel and an inner panel by an adhesive with respect to a portion where a stiffening member model remains in a flange portion connecting the outer panel and

INDUSTRIAL APPLICABILITY

According to the present invention, deformation can be reduced when a load acts on automotive frame parts and stiffness of the automotive frame parts can be improved. In addition, according to the present invention, weight of automotive frame parts can be reduced while stiffness thereof is maintained.

REFERENCE SIGNS LIST

1 A-pillar-lower
3 Outer panel
3a Top portion
3b Side wall portion
3c Flange portion
3d Inner surface
5 Inner panel
5a Inner surface
7 Stiffening member
9 Optimal shape
11 A-pillar-lower (First comparison example)
13 Outer panel
13a Top portion
13b Side wall portion
13c Flange portion
15 Rib
21 A-pillar-lower (Second comparison example)
31 A-pillar-lower
33 Stiffening member
41 Optimal shape
43 Columnar portion
45 Flange remaining portion
51 Optimization analysis model
57 Jig

The invention claimed is:

1. An automotive frame part that is an A-pillar-lower part, the A-pillar-lower part comprising:
   an outer panel made of metal, the outer panel having a vertical portion with a diverging upper portion in planar view and a cross section intersecting a portion corresponding to a horizontal side and a vertical side of the vertical portion with the diverging upper portion is a hat-shaped cross section including a top portion, a side wall portion, and a flange portion;
   an inner panel made of metal, the inner panel being connected to the flange portion of the outer panel and forming a closed cross section with the outer panel; and
   plastic stiffening members that each have one end connected to an inner surface of the outer panel and another end connected to an inner surface of the inner panel in a space formed between the outer panel and the inner panel,
   wherein the shape and the disposition of the stiffening members are set based on an analysis result from a shape optimization analysis method and each of the stiffening members has a columnar shape with both end parts bulging.

2. The automotive frame part according to claim 1, wherein the shape optimization analysis method sets an objective function for maximizing stiffness and performs analysis under a constraint function of setting a volume constraints rate of 3 to 40%, using the solid isotropic material with penalization method of topology optimization.

3. The automotive frame part according to claim 1, wherein the shape optimization analysis method sets an objective function for minimizing volume and maximizing stiffness and performs analysis under a constraint function of setting a predetermined displacement amount, using the solid isotropic material with penalization method of topology optimization.

4. The automotive frame part according to claim 1, wherein the one end of each of the plastic stiffening members is connected to the inner surface of the outer panel and the other end of each of the plastic stiffening members is connected to the inner surface of the inner panel by an adhesive.

* * * * *